US007959045B2

(12) United States Patent
Kuge et al.

(10) Patent No.: US 7,959,045 B2
(45) Date of Patent: Jun. 14, 2011

(54) SPOUT ASSEMBLY AND METHOD OF MANUFACTURING PACKAGING BAG PROVIDED WITH SPOUT ASSEMBLY

(75) Inventors: Raizo Kuge, Tokyo (JP); Hiroaki Takashima, Toyama (JP); Yuichiro Moriyama, Toyama (JP)

(73) Assignees: Hosokawa Yoko Co., Ltd., Tokyo (JP); Shirouma Saiensu Kabushiki Kaisha, Toyama (JP)

( * ) Notice: Subject to any disclaimer, the term of this patent is extended or adjusted under 35 U.S.C. 154(b) by 1113 days.

(21) Appl. No.: 11/662,083

(22) PCT Filed: Sep. 7, 2005

(86) PCT No.: PCT/JP2005/016432

§ 371 (c)(1),
(2), (4) Date: Mar. 7, 2007

(87) PCT Pub. No.: WO2006/028139

PCT Pub. Date: Mar. 16, 2006

(65) Prior Publication Data

US 2008/0063319 A1 Mar. 13, 2008

(30) Foreign Application Priority Data

Sep. 9, 2004 (JP) ................................ 2004-262873

(51) Int. Cl.
*B65D 5/72* (2006.01)
*B65D 35/00* (2006.01)
*A47G 19/22* (2006.01)
*F16K 15/00* (2006.01)

(52) U.S. Cl. ........ 222/495; 222/107; 222/212; 222/571; 220/714; 220/717; 137/541

(58) Field of Classification Search .................. 222/213, 222/212, 571, 495, 496, 497, 105, 107, 494; 383/80, 81, 83; 137/541; 220/711, 717, 220/714

See application file for complete search history.

(56) References Cited

U.S. PATENT DOCUMENTS

| | | | | |
|---|---|---|---|---|
| 2,848,145 | A * | 8/1958 | Livingstone | 222/542 |
| 3,438,554 | A * | 4/1969 | Schwartzman | 222/496 |
| 3,506,162 | A * | 4/1970 | Schwartzman | 222/207 |
| 3,523,628 | A * | 8/1970 | Colvin | 222/107 |
| 3,592,365 | A * | 7/1971 | Schwartzman | 222/209 |
| 3,705,668 | A * | 12/1972 | Schwartzman | 222/207 |
| 3,794,213 | A * | 2/1974 | Schwartzman | 222/107 |
| 3,874,563 | A * | 4/1975 | Schwartzman | 222/213 |
| 4,073,389 | A | 2/1978 | Angarola et al. | |
| 5,850,953 | A * | 12/1998 | Dallas, Jr. | 222/571 |
| 6,609,639 | B1 * | 8/2003 | Genthon | 222/571 |
| 6,854,623 | B2 * | 2/2005 | Masuda | 222/212 |
| 7,249,694 | B2 * | 7/2007 | Masuda | 222/212 |
| 2004/0026465 | A1 * | 2/2004 | Klopfer | 222/546 |

FOREIGN PATENT DOCUMENTS

| | | |
|---|---|---|
| JP | 3-129201 | 12/1991 |
| JP | 2000-168806 | 6/2000 |
| JP | 2004-59071 | 2/2004 |
| JP | 2004-149173 | 5/2004 |

* cited by examiner

*Primary Examiner* — Kevin P Shaver
*Assistant Examiner* — Stephanie E Williams
(74) *Attorney, Agent, or Firm* — Young & Thompson

(57) ABSTRACT

A spout assembly for a packaging bag for improving the prevention of oxidation to an inner content and discharging such content at a desired amount. The spout assembly mounted to the bag body includes a spool to move along the axial direction of the spout assembly and an urging member having an outer peripheral surface fixed to the inner peripheral surface of the spout assembly and adapted to urge the spool toward the bag body side. A check valve allows the inner content to flow only from the bag body side toward the mouth portion side. The urging member has a seat surface for the spool and the urging member presses the spool against the seat surface to shut off the flow of the inner content, and when an inner pressure of the bag body or a suction force of the mouth reaches a predetermined value, the spool separates from the seat surface.

5 Claims, 9 Drawing Sheets

(a)

(b)

SPOUT ASSEMBLY AND METHOD OF MANUFACTURING PACKAGING BAG PROVIDED WITH SPOUT ASSEMBLY

FIELD OF THE INVENTION

The invention relates to a spout assembly for discharging an inner content and also relates to a method of manufacturing a packaging bag provided with such a spout assembly.

BACKGROUND ART

There is known a packaging bag which is provided with a spout assembly at the upper portion of a bag body. In general, such a packaging bag, provided with the spout assembly, has an inner content to be discharged through the spout assembly by grasping and crushing the bag body with a hand to thereby increase an inner pressure and take out the inner content, or sucking the inner content through the mouth portion of the spout assembly.

In a developed art, the packaging bag with the spout assembly is provided with a valve body which permits an inner content to flow out from the bag body only where a predetermined condition is satisfied.

For example, in a Patent Publication 1, there is shown a packaging bag in which, in order to prevent air from invading inside the bag body through the spout assembly, a valve body formed of an elastic material such as rubber is attached to a bag body side in the axial direction of the spout assembly. Such a valve body is formed from a relatively thin plate-shaped elastic material and provided with a cross-shaped cut-in penetrating the elastic material in its thickness direction.

According to such a valve body, when the bag body is grasped and crushed, the inner pressure increases and the cut-in portion is opened toward an opening side by the inner content pushed by the hand, thus ensuring an inner content flow-out path. When the grasping pressure is weakened, the inner pressure is decreased and the opened cut-in portion is returned to the original shape by its self resilient force, and the valve body is hence closed. In the packaging bag provided with the spout assembly disclosed in the Patent Publication 1, the inner content is discharged through such operations as mentioned above and the air invasion into the bag body is also prevented through such operations.

On the other hand, Patent Publication 2 discloses an invention of a packaging bag provided with a spout assembly, which is provided with a check valve, inside the spout assembly, permitting an inner content to flow only to the bag body side from the mouth side of the spout assembly.

The check valve provided for this packaging bag with the spout assembly includes a valve body moving along the axial direction of the spout assembly, an urging member urging the valve body from the bag body side toward the mouth side, and a valve seat formed inside the spout assembly and having a central flow-passage.

According to the check valve, when an aspirated air is introduced inside the spout assembly from outside, the aspirated air pushes down the valve body against the urging force, thereby ensuring the flow-passage. Thus, the aspirated air enters inside the bag body. On the contrary, when the introduction of the aspirated air form the outside stops, the valve body urged by the urging member abuts against the valve seat to thereby close the flow-passage and shut off the flowing inside the spout assembly. Therefore, the aspirated air flowing into the bag body is prevented from flowing outside the packaging bag.

Patent Publication 1: Japanese Patent Unexamined Application Publication No. 2004-59071.

Patent Publication 2: Japanese Patent Unexamined Application Publication No. 2000-168806.

DISCLOSURE OF THE INVENTION

Problems to be Solved by the Invention

The invention disclosed in the Patent Publication 1, however, has the valve body formed by forming the cut-in portion to the elastic member, and it is difficult to completely keep tightly sealed state with respect to the cut-in portion. In addition, an area of the cut-in portion can have been widened with a repeated open-close operation. Because of this reason, only a low oxidation prevention effect could be expected. Furthermore, in this valve body, the cut-in portion can be opened only at the time when some degree of pressure is applied to the valve body, and hence, it is necessary to grasp and crush the bag body with relatively strong hand force. Moreover, when the valve body is opened, the inner pressure in the bag body is considerably high. Thus, when the valve body is opened, the inner content can be violently discharged.

Furthermore, as disclosed in the invention of the Patent Publication 1, in which the valve body is disposed to the rear side of the mouth portion of the spout assembly, there is adapted a process of preliminarily mounting the valve body to the spout assembly, attaching this spout assembly to the bag body and then charging an inner content inside the bag body from the unsealed reverse side. On the other hand, there may be also adapted process of preliminarily closing the bottom side of the bag body, charging an inner content from the opened upper side thereof and then mounting the spout assembly provided with the valve body to the opened upper portion.

In either one of the above processes, there may cause an adverse case such that when the inner content adheres to a portion to be sealed, a seal defect will be caused.

Moreover, the valve body is mounted to the base portion of the spout assembly, and it is difficult to attach the spout assembly to the bag body only after the mounting to the valve body to the spout assembly. For this reason, it is difficult to freely perform workings of the preparation of the bag body, the mounting of the spout assembly, the filling of the inner content, the mounting of a cap, and the changing of attaching processes, and hence, it is difficult to separately carry out these workings by different persons or factories to provide products to a market thereafter.

On the other hand, the invention disclosed in the Patent Publication 2 adopts a structure in which a fluid flowing inside the bag body does not leak outside the bag body. Thus, this invention is not applied to a packaging bag for discharging, therefrom, the inner content filling inside the bag body.

Then, an object of the invention is to provide a spout assembly allowing for ensuring a high sealing performance to the spout assembly, providing a high oxidation prevention effect and surely taking out an inner content at a desired amount, and also provide a method of manufacturing a packaging bag provided with such a spout assembly capable of effectively and freely changing processes for the manufacture.

Means for Solving the Problem

According to the invention, in order to solve the above problems, the following solving means are adopted.

First, the invention adopts a spout assembly mounted to a bag body having an inner content accommodated therein and configured to discharge the inner content filling the bag body, wherein the spout assembly houses therein a check valve permitting the inner content to flow only from the bag body side to the mouth portion side of the bag body, the check valve includes a spool to move along an axial direction of the spout assembly; and an urging member having an outer peripheral surface fixed to the inner peripheral surface of the spout assembly and adapted to urge the spool toward the bag body side, the urging member is formed with a seat surface for the spool urged by the urging member to abut against the seat surface, and the urging member presses the spool against the seat surface to thereby shut off flowing of the inner content inside the spout assembly, and when an inner pressure inside the bag body or a suction force from the mouth portion reaches a predetermined value, the spool is separated from the seat surface against the urging force of the urging member, thereby permitting the inner content to flow from the bag body side to the mouth portion side.

Further, in the above spout assembly, the urging member includes a fixing portion for fixing the urging member in the spout assembly; and a coil spring extending from the fixing portion along an axial direction of the urging member, the fixing portion is formed, inside thereof, with a flow passage extending in the axial direction of the urging member, and the seat surface is formed to an end portion side opposite to a side having the coil spring provided thereon with respect to the axial direction of the fixing portion, the spool includes a shank portion inserted from the seat surface side into the flow passage of the fixing portion and the coil spring; and a valve body formed to a fixing portion side end portion of the shank portion for abutting against the seat surface, the shank portion and the coil spring are provided with lock portions to be locked with each other, and the spool has a distance between the lock portion of the shank portion and the valve body formed smaller than a distance between the lock portion of the coil spring and the seat surface in a natural length of the coils spring, and the spool is always urged to the bag body side by the coil spring when the shank portion and the coil spring are locked with each other.

Further, in the above spout assembly of the invention, that the fixing portion of the urging member may be directed to the mouth portion side and the urging member may be fixed to a portion in the vicinity of the mouth portion of the spout assembly.

In addition, in the above spout assembly of the invention, it may be adopted that the fixing portion includes a drip preventing portion to prevent, from dripping down, an inner content taken out of the bag body and remaining to the end portion of the spout assembly, and the drip preventing portion projects from the end of the spout assembly, having an inner surface widened toward outside in the axial direction of the spout assembly.

In the above spout assembly, the seat surface may be formed to the inner peripheral surface of the drip preventing portion, and the valve body may abut against the seat surface for shutting off the flowing of the inner content inside the spout assembly.

Furthermore, in the invention, the spout assembly may further include a cap fastened to the outer periphery of the spout assembly for tightly sealing the mouth portion of the spout assembly, and the inner surface of the cap includes a seal portion to abut against the inner surface of the drip preventing portion for sealing the cap as the cap is fastened to the spout assembly; and a pressing portion for pressing the valve body toward the urging member.

Second, according to the invention, there is adopted a method of manufacturing a packaging bag including a spout assembly having therein the packaging bag including a bag body having an inner content accommodated therein; and a spout assembly mounted to the bag body and allowing the inside portion and the outside portion of the bag body to communicate with each other, the method comprising: a spout assembly mounting step of inserting the spout assembly into the bag body with a mouth portion thereof remaining outside the bag body and sealing the mouth portion to mount the spout assembly to the bag body; an inner content charging step of charging the inner content into the bag body through the spout assembly; and a check valve mounting step of mounting a check valve allowing the inner content to flow into the spout assembly only from the inside of the bag body to the outside thereof, wherein the check valve has a spool to move along an axial direction of the spout assembly and an urging member for urging the spool toward the bag body side, and the check valve is constructed such that the urging member is formed, at the outer peripheral portion thereof, with an engagement portion to be engaged with the inner peripheral surface of the spout assembly and the spool is movable inside the check valve, and in the check valve mounting step, the check valve is inserted through the mouth portion of the spout assembly and is fixed to the inner peripheral surface through engagement of the inner peripheral surface with the engagement portion.

Furthermore, according to the invention, in the packaging bag manufacturing method, the check valve has the urging member including a fixing portion for fixing the urging member having the engagement portion to the inner peripheral surface of the spout assembly; and a coil spring extending from the fixing portion along an axial direction of the urging member, and the spool includes a shank portion inserted into the flow passage of the fixing portion and the coil spring; and a valve body formed to a fixing portion side end portion of the shank portion and configured to abut against the seat surface, and the shank portion and the coil spring are locked with each other, and the urging member and the spool are assembled integrally before the check valve is mounted to the spout assembly.

Benefits of the Invention

According to the spout assembly provided by the invention, firstly, the check valve shuts off the flow passage of the spout assembly to prevent air from entering the bag body, thus effectively preventing oxidization of the inner content. Secondly, the spool of the check valve is moved in response to the inner pressure of the bag body, and changing of the inner pressure of the bag body by controlling the bag grasping force suitably adjusts the opening degree of the check valve. This easily adjusts the discharging amount of the inner content.

The spout assembly houses the check valve therein, and if the packaging bag provided with the spout assembly is fallen down, the check valve prevents the inner content from flowing out, thus preventing the inner content from spilling out through the mouth portion of the spout assembly.

In addition, disposing of the check valve at a portion proximate to the mouth portion effectively prevents the inner content from remaining at the mouth portion. However, it is difficult to completely prevent the remaining of the inner content. With this point, according to the invention, the drip preventing portion is provided to the check valve. The drip preventing portion surely blocks the dripping of the inner content remaining proximate to the mouth portion of the spout assembly.

Further, as the method of discharging the inner content, there is proposed a structure of increasing the inner pressure of the bag body and pushing out the inner content by grasping the bag body and also provided a structure of sucking out the inner content through the mouth portion of the spout assembly. In the sucking type structure, the drip preventing portion is not provided, and in the push-out type structure, the drip preventing portion may be provided.

Furthermore, according to the packaging bag manufacturing method of the invention, firstly, the manufacturing thereof is facilitated. That is, the check valve is inserted through the mouth portion of the spout assembly for housing, and anyone easily manufactures the packaging bag. In this time, the urging member and the spool of the check valve are preliminarily assembled, and the check valve is fixed to the inner portion of the spout assembly by one-touch operation.

Secondly, the manufacturing steps may be freely changed in accordance with kinds of the inner content. That is, in a conventional art, a spout assembly having a check valve preliminarily assembled thereto is only mounted to the bag body, so that it is necessary to fill the packaging bag with an inner content before the assembling of the spout assembly. As mentioned above, in such a case, the inner content is adhered to a portion to be sealed, which may cause a defective sealing condition.

On the contrary, according to the manufacturing method of the invention, it may be possible to deliver a packaging bag provided with a spout assembly before a check valve is mounted and a check valve to a dealer who fills the packaging bag with an inner content, and then, the dealer mounts the check valve at the inner content filling time. In such a case, the seal defect is prevented from causing.

On the other hand, according to the manufacturing method of the invention, it may be possible that, as conventionally carried out, a spout assembly to which a check valve has already been assembled is mounted to a bag body, and an inner content is charged into the bag body through an opened lower edge of the bag body which has an opened upper edge to which the spout assembly is mounted. In such a case, the inner content is surely prevented from flowing out without sealing a mouth portion of the spout assembly with a cap.

In this manufacturing method, however, the bag body is sealed after the filling of the inner content, and the inner content may adhere to a portion to be sealed. If the inner content adheres, this portion may cause a seal defect. According to the invention, on the contrary, the inner content is charged through the spout assembly, and it is not necessary to adopt such a sealing method which may cause the seal defect as mentioned above.

Thus, wide business mode may be adopted.

REFERENCE NUMERAL

1—spout assembly, 5—flow-passage, 6—mouth portion, 8—engagement groove, 10—check valve, 11—urging member, 12—fixing portion, 13—engagement pawl, 15—coil spring, 18—drip preventing portion, 19—seat surface, 20—spool, 21—shank portion, 24—valve body, 25—inclining surface, 30—bag body, 40—cap, 41—seal portion, 50—discharge guide, 60—cap, 61—recess, 62—ring-shaped member, 63—projecting thread, 70—cap, 71—discharge guide, 71*a*—spout, 72—ring-shaped member, 73—projecting thread, 75—plug, 78—seam line, 80—cap, 83—cylindrical portion, 84—discharge guide, 85—holding portion, 86—second cap, 87—plug portion, 90—inserted portion, 91—stud, 92—head, 93—projection, 100—cap, 101—accommodation portion

BEST MODE FOR EMBODYING THE INVENTION

Hereunder, preferred embodiments of the invention will be described with reference to the accompanying drawings.

Figure 1:
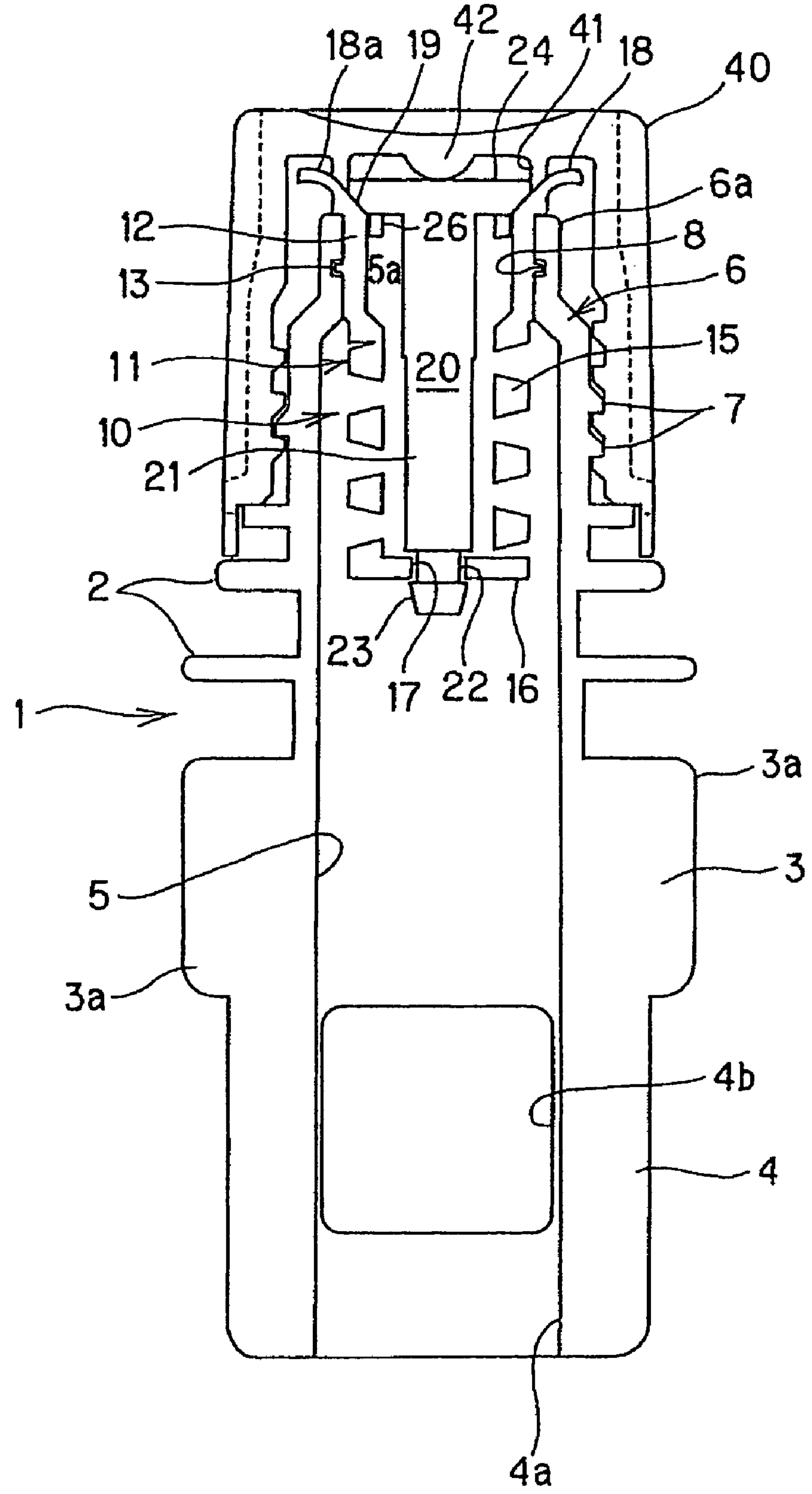
FIG. 1 is an elevational section of a spout assembly according to an embodiment of the invention.
Figure 2:
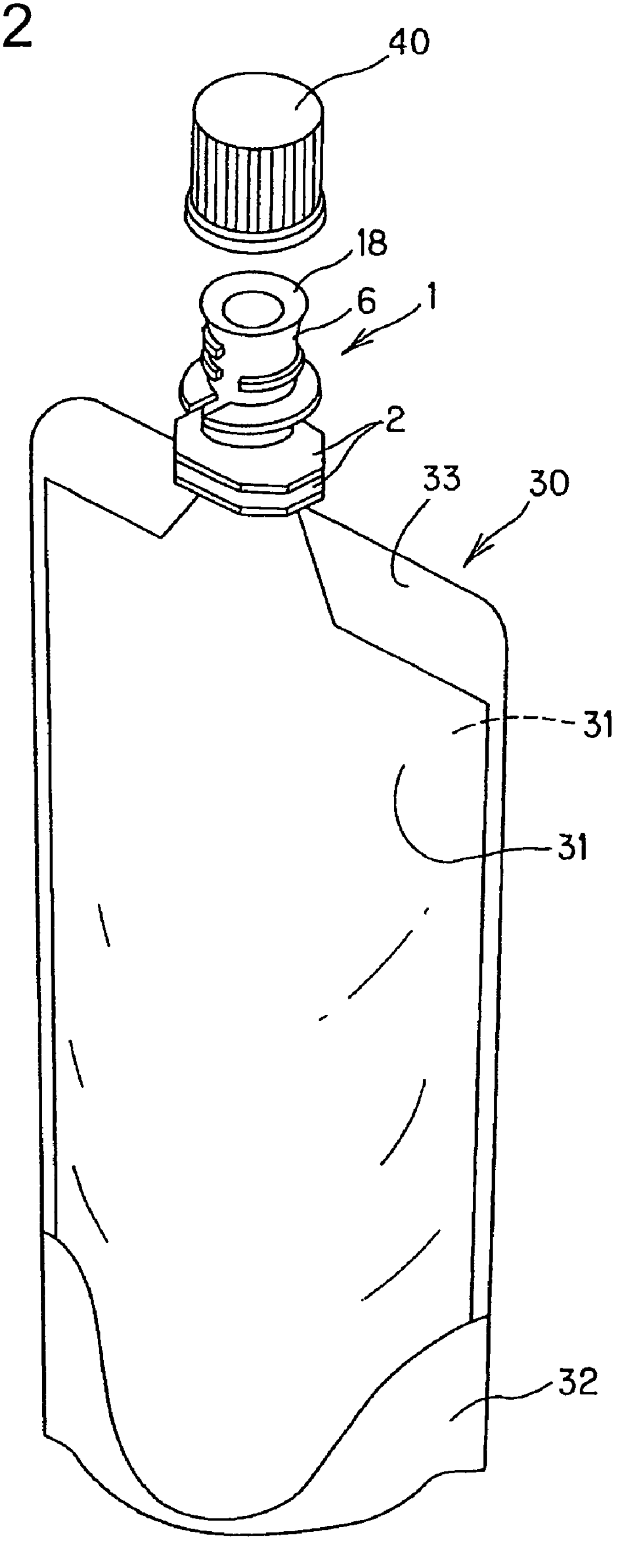
FIG. 2 is a perspective view of a standing pouch having the spout assembly of FIG. 1 applied thereto.

FIG. 1 shows a spout assembly 1 according to one embodiment of the invention. FIG. 2 is a perspective view of a packaging bag having the spout assembly 1 mounted thereto.

As shown in FIG. 1, in this embodiment, a generally used self-standing pouch is utilized. The standing pouch has a bag body 30, which is composed of a pair of opposing flat surface portions 31 and a bottom portion, not shown, bonded to the flat surface portions 31 at the bottom portion thereof. However, the packaging bag having this spout assembly mounted thereto is not limited to the example of such standing pouch, and is applicable to a gazette type packaging bag, a gazette type flat bottom packaging bag or flat bag, or the like.

The respective flat surface portions 31 are formed so as to each have a rectangular shape, and the side edge portions thereof are bonded together. The bottom portion, not shown, thereof has a peripheral edge portion which is bonded to the inner surfaces of the respective flat surface portions 31 so as to close the bottom portion of the bag body 30. The bonded portions thereof are formed as a seal portion 32 acting as leg portion for standing the package bag with the spout assembly itself.

Further, the upper edge portion 33 of the bag body 30 is sealed by bonding the upper edge portions of the respective flat surface portions 31 having the spout assembly 1 sandwiched therebetween at substantially the central portion in the width direction of the bag body 30. The mouth portion 6 of the spout assembly 1 projects outward from the bonded upper edge portion 33 of the bag body 30. A cap 40 is screw engaged with the mouth portion 6 to be detachable.

The spout assembly 1 has substantially a circular cylindrical shape and is provided, at its outer peripheral portion to the axially central portion, with a base seat 2 in form of layers so as to extend outward in a radial direction thereof. The portion of the spout assembly 1 above this base seat is the mouth portion 6, and the portion laterally extending from the peripheral portion of the spout assembly 1 at directly below is a mount portion 3 for mounting the spout assembly 1 to the bag body 30. The spout assembly 1 is further provided, at a portion lower than the mount portion 3, with a guide portion 4 for guiding outward the inner content in the bag body 30. The spout assembly 1 has a flow passage 5 formed inside thereof and axially penetrating therethrough. The flow passage 5 allows the inner content in the bag body 30 to flow therethrough, flowing out through the mouth portion 6 of the spout assembly 1.

The mount portion 3 positioned directly below the base seat 2 has flat flanged portions 3*a* extending laterally outward. The flanged portions 3*a* are sealed, at their outer peripheral surfaces, with the upper edge portion of the bag body 30.

The guide portion 4 of the spout assembly 1 has a main guide port 4*a* at its lower end portion thereof, and an auxiliary guide port 4*b* formed to the side surface portion thereof. The inner content flows in the flow passage 5 of the spout assembly 1 through these main and auxiliary guide ports 4*a* and 4*b*.

Furthermore, the mouth portion 6 has external screw threads 7 formed to the outer peripheral surface thereof. A cap 40 is screw-engaged with the external screw threads 7 to thereby fasten and close the mouth portion 6. The mouth portion 6 has a squeezed upper portion 6*a* having a diameter smaller than that of the portion having the screw threads 7 formed thereto.

The spout assembly 1 further houses a check valve 10 adapted to open or close the flow passage 5 formed inside the spout assembly 1.

Figure 3:
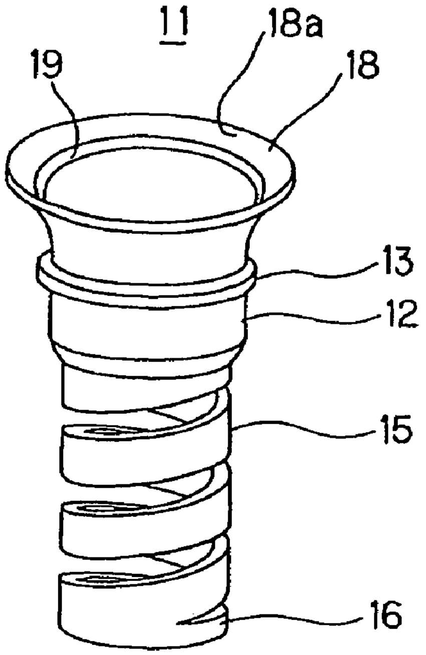
FIG. 3 is a perspective view showing an urging member.
Figure 4:
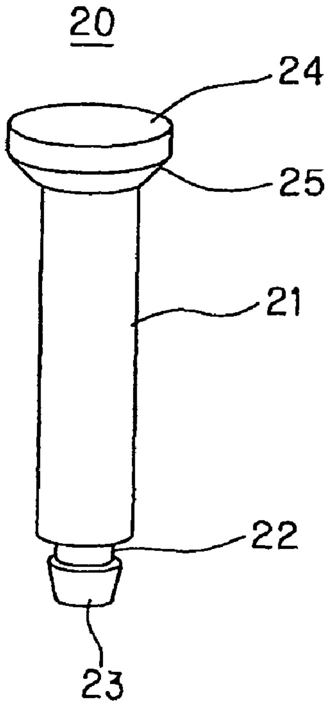
FIG. 4 is a perspective view of a spool.

The check valve 10 includes an urging member 11 (see FIG. 3) fixed to the inner peripheral surface of the spout assembly 1. The check valve 10 includes a spool 20 (see FIG. 4) disposed to be movable in the axial direction of the spout assembly 1 and urged by the urging member 11 toward the bag body (30) side from the mouth portion (6) side. The urging member 11 has a cylindrical structure. The urging member 11 includes a fixing portion 12 for fixing the urging member 11 to the inner surface of the spout assembly 1. The urging member 11 includes a coil spring 15 formed integrally with the fixing portion 12 and extending from the fixing portion 12 toward the bag body (30) side. An engagement pawl 13 is formed on the outer peripheral surface of the fixing portion 12 so as to extend in the circumferential direction thereof. An engagement groove 8 is also formed on the inner peripheral surface of the spout assembly 1 to the upper portion 6*a*, having a small diameter, of the mouth portion 6. The engagement groove 8 extends in the circumferential direction thereof. Fitting of the engagement pawl 13 to the engagement groove 8 permits the urging member 11 to be fixed to the upper portion 6*a* of the mouth portion 6.

Further, it is to be noted that although, in the embodiment shown in FIG. 1, the engagement pawl 13 is formed to the fixing portion 12 and the engagement groove 8 is formed to the spout assembly 1. The invention is not limited to such embodiment and the engagement groove 8 may be formed to the fixing portion 12 and the engagement pawl 13 may be formed to the spout assembly 1.

The coil spring 15 is provided so as to extend toward the bag body (30) side from the end portion on the bag body side in the axial direction of the fixing portion 12. The coil spring 15 has a front end to which a disc-shaped end plate 16 is integrally formed. This end plate 16 has a central hole 17 with which the spool 20 is engageable. Further, this end plate 16 serves as an inner content receiving portion when the inner content is taken out from the bag body 30.

In addition, the urging member 11 is further provided with a drip preventing portion 18 for preventing dripping of the inner content from the mouth portion 6 of the spout assembly 1. The drip preventing portion 18 is formed integrally with the fixing portion 12 at the end portion thereof on the opposite side to the coil spring 15. The drip preventing portion 18 has a tapered shape widened toward the front end portion thereof so as to project upward over the mouth portion 6 of the spout assembly 1. Furthermore, an inner surface 18*a* of the drip preventing portion 18 is formed with a seat surface 19 against which a valve body 24 of the spool 20 mentioned hereinafter abuts.

The spool 20 is composed of a shank portion 21 to be inserted inside the urging member 11 and the disc shaped valve body 24 formed to the axial one end of the spool 20. This spool 20 is disposed such that the valve body 24 is directed toward the drip preventing portion (18) side in the axial direction thereof and the front end of the shank portion 21 is directed toward the bag body (30) side in the axial direction, respectively. The valve body 24 abuts against the seat surface 19 formed to the inner surface 18*a* of the drip preventing portion 18 to thereby shut off the flowing of the inner content inside the spout assembly 1. The valve body 24 releases the flow passage 5 for flowing the inner content from the bag body side toward the mouth portion (6) side when the valve body 24 is separated from the inner surface of the drip preventing portion 18. The peripheral edge of the valve body 24 has a chamfered inclining back surface 25 so as to tightly contact the inner surface of the drip preventing portion 18. In addition, a guide 26 is formed to the back surface of the valve body 24 so as to extend downward. This guide 26 serves to make comfortable seating to the seat surface 19 of the valve body 24 by coinciding the axis of the spool 20 with the axis of the urging member 11 at the time when the spool 20 again abuts against the seat surface 19 after the valve body 24 is once apart from the seat surface 19.

In the meantime, the shank portion 21 has a tip end formed as a stopper 23 which is forward tapered so as to provide an arrow-shape, and the stopper 23 has a base portion to which an engagement groove 22 is formed so as to extend in the circumferential direction along the outer peripheral surface of the shank portion 21. The spool 20 is inserted into the hole 17, from the stopper 23, formed to the end plate 16 of the coil spring 15. Hence, the spool 20 and the urging member 11 are integrated together. Further, the stopper 23 formed to the tip end of the shank portion 21 has a forward tapered shape, and it is smoothly inserted into the hole formed to the end plate 16. On the other hand, the hole of the end plate 17 is fitted to the engagement groove 22 of the shank portion 21, and the stopper 23 prevents the shank portion 21 from coming off from the hole 17.

In this spool 20, a distance between the inclining surface 25 formed to the lower surface of the valve body 24 and the engagement groove 22 is formed to be smaller than a distance between the seat surface 19 formed to the inner surface 18*a* of the drip preventing portion 18 of the urging member 11 and the end plate 16 formed to the front end of the spring coil 15. According to this structure, when the spool 20 and the urging member 11 are assembled integrally, the spool 20 maintains the coil spring 15 of the urging member in a compressed state of the length smaller than the natural length. Accordingly, the valve body 24 of the spool 20 is always urged toward the seat surface 19 of the drip preventing portion 18.

The urging member 11 and the spool 20 constituting such check valve 10 is formed of a resin material.

The spout assembly housing the check valve 10 of the structure mentioned above functions as shown in FIG. 5. FIG.

Figure 5:
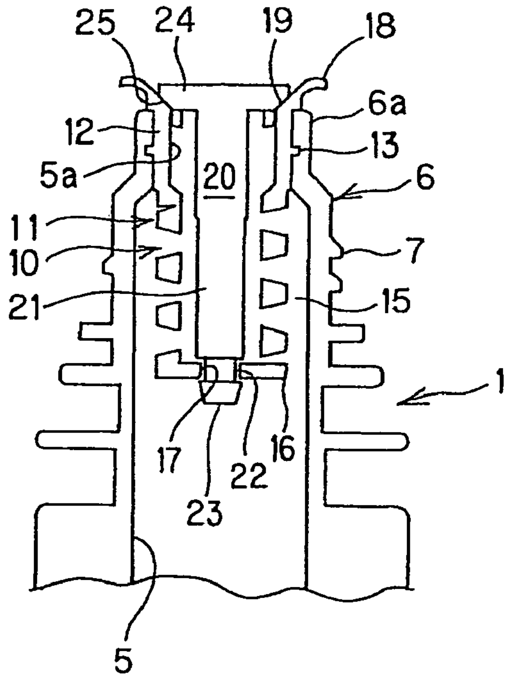
FIG. 5 is a view showing an open or close condition of a check valve.
Figure 5:
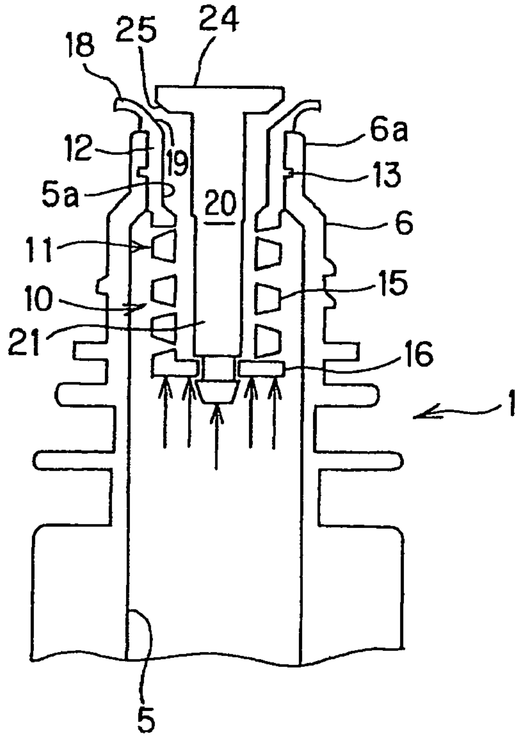

5(*a*) shows the spool 20 of the check valve 10 in the closed state, and FIG. 5(*b*) shows the spool 20, on the contrary, in the opened state.

When the inner pressure in the bag body 30 is low, as shown in FIG. 5(*a*), the spool 20 is pressed down on the bag body (30) side by the urging force of the coil spring 15. Then, the valve body 24 abuts against the seat surface 19 to thereby shut off the flow passage 5 of the spout assembly 1. Therefore, the invasion of the air into the bag body 30 through the spout assembly 1 is surely prevented and the inner content is prevented from oxidizing.

On the other hand, when the inner pressure is increased by, for example, grasping the bag body 30, as shown in FIG. 5(*b*), the inner content is pressed against the end plate 16 formed to the front end of the coil spring 15. Furthermore, the inner content pushes up the spool 20 to the mouth portion (6) side against the urging force of the coil spring 15. Accordingly, the valve body 24 of the spool 20 is separated from the seat surface 19 formed to the inner surface 18*a* of the drip preventing portion 18, thus ensuring the flow passage inside the spout assembly 1. Then, the inner content passes through the check valve 10 and the drip preventing portion 18 and discharged outward through the mouth portion 6 of the spout assembly 1.

In this operation, the moving strokes of the spool 20 of course differ in response to the inner pressure in the bag body 30. For example, when the bag body 30 is grasped weakly, the inner pressure slightly increases, and in this case, the spool 20 is also moved slightly and only a small gap is formed between the valve body 24 and the seat surface 19 in accordance with the small movement (i.e., displacement) of the spool 20. On the contrary, when the bag body 30 is grasped strongly, a large gap is formed between the valve body 24 and the seat surface 19 in accordance with the large displacement of the spool 20. Utilizing this function, the amount of the inner content to be taken out from the bag body is properly adjusted.

Furthermore, when the inner content is discharged, in the above description, one example for increasing the inner pressure of the bag body 30 is mentioned, but the inner content may be sucked out through the mouth portion of the spout assembly 1. For example, a person may suck the inner content through the mouth portion by contacting his (or her) mouth thereto. In such case, the valve opening amount of the check valve 10 is adjusted by the sucking force of the person.

The mouth portion 6 of the spout assembly 1 is closed by means of the cap 40 as mentioned above. As shown in FIG. 1, to the inner surface of the upper surface of the cap 40, is formed with a ring-shaped seal portion 41 and a semi-circular spool press 42.

The seal portion 41 has a diameter slightly larger than that of the valve body 24 so as to surround the valve body 24. This seal portion 41 depresses the inner surface of the drip preventing portion 18 by fastening the cap 40 to the mouth portion 6 of the spout assembly 1 to thereby seal the drip preventing portion 18, and even if the inner content remains in the drip preventing portion 18, it is prevented from leaking outward. Further, the spool press 42 is formed so as to protrude downward from the inner surface of the central upper portion of the cap 40. When the spool press 42 depresses the upper surface of the valve body 24 of the spool 20 toward the drip preventing portion (18) side by fastening the cap 40 with respect to the mouth portion 6 of the spout assembly 1. Thus, the lower surface of the valve body 24 is pressed against the seat surface of the drip preventing portion 18, thereby ensuring the sealing.

A packaging bag provided with such a spout assembly 1 will be manufactured in accordance with manners mentioned hereunder.

First, a film material is prepared and the film material is bonded so as to provide a bag body 30 having an upper edge 33 opened. The bag body 30 is formed from a pair of rectangular flat film materials for forming the flat surfaces and one sheet of flat film material forming a bottom surface.

Next, a spout assembly 1 is mounted to the opened upper edge of the bag body 30. The spout assembly 1 has a mount portion 3, and the mount portion 3 is mated in position with the upper edge 33 of the bag body 30 so as to snap the mount portion 3 with the upper edge portions 33 of the opposing flat surface portions 31. Thereafter, the upper edge portions 33 of the flat surface portions 31 and the upper edge portions 33 and the mount portion 3 are bonded together.

After the spout assembly 1 has been mounted, a content is charged inside the bag body 30 through the mouth portion 6 of the spout assembly 1.

Thereafter, the check valve 10 is inserted into the spout assembly 1 through the mouth portion 6 thereof with the spool 20 and the urging member 11 being assembled integrally. At this time, the coil spring 15 of the urging member 11 and the shank portion 21 of the spool 20 are inserted into the bag body (30) side, and the fixing portion 12 of the urging member 11 and the valve body 24 of the spool 20 are, on the other hand, inserted toward the mouth portion (6) side. The check valve 10 inserted into the spout assembly 1 is fixed to the spout assembly 1 by fitting the engagement pawl 13 formed to the outer periphery of the fixing portion 12 of the urging member 11 into the engagement groove 8 formed to the inner peripheral surface of the spout assembly 1. When the check valve 10 is fixed to the spout assembly 1, the drip preventing portion 18 constituting the urging member 11 projects outside the mouth portion 6 of the spout assembly 1 (see FIG. 1).

Thereafter, the cap 40 is fastened to the mouth portion 6 of the spout assembly 1 to thereby tightly seal the mouth portion 6 thereof.

In the above description, although a spout assembly housing a check valve including an urging member to which a drip preventing portion is integrally formed is explained, the invention is not limited to such structure.

Figure 6:
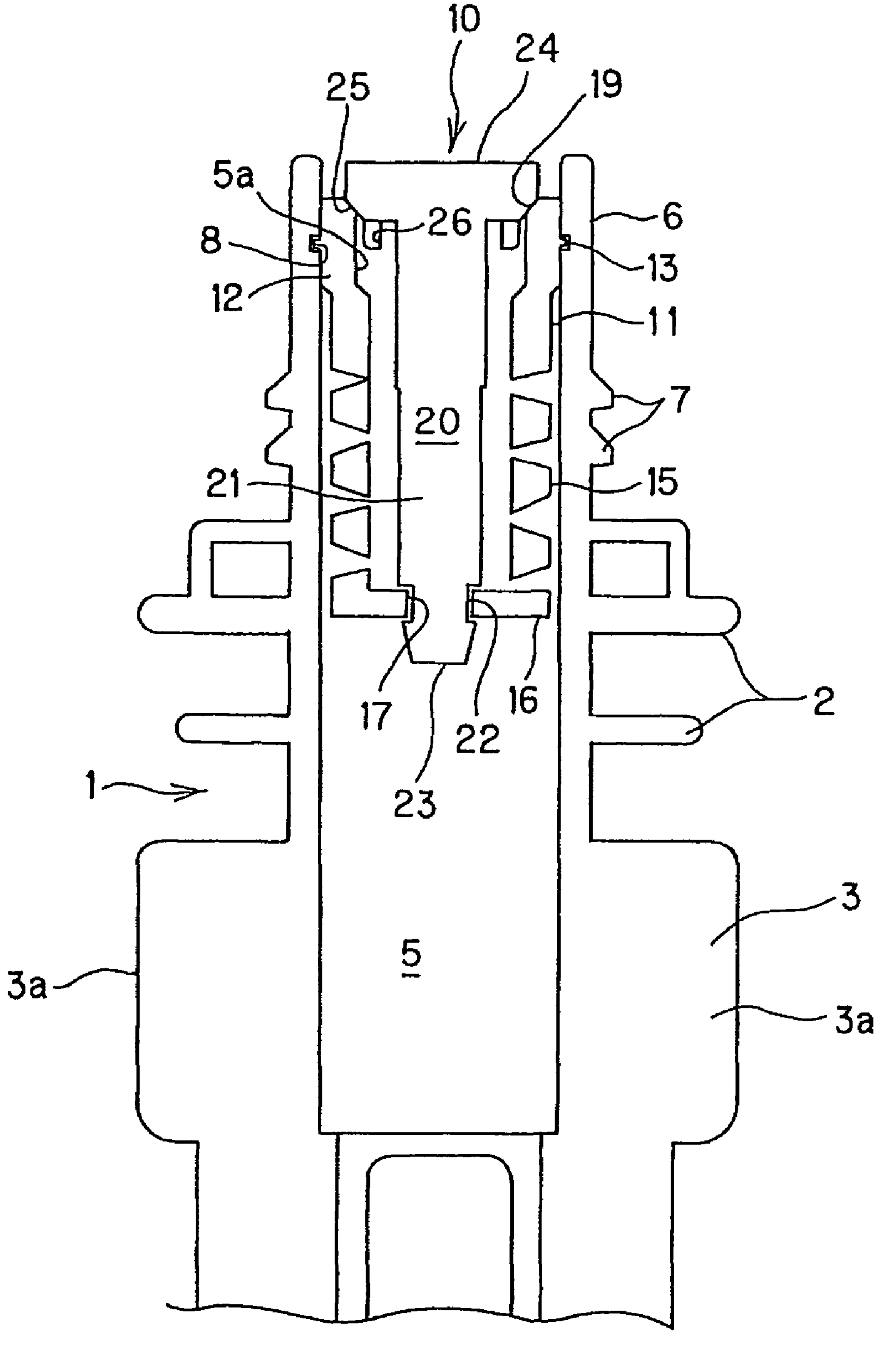
FIG. 6 is an elevational section showing an example of a spout assembly provided with a valve body without a drip preventing portion.

FIG. 6 represents a spout assembly 1 in which a check valve 10 is housed according to another embodiment of the invention. Further, it is to be noted that this embodiment is substantially identical, in the basic structure, to the check valve 10 shown in FIGS. 1 to 5 in the point that the urging member 11 and the spool 20 are assembled integrally, and like reference numerals are added to portions or members corresponding to those mentioned before, thus omitting the detailed explanations thereof from describing herein.

The check valve 10 applied to the spout assembly 1 of this embodiment is not provided with a drip preventing portion. The urging member 11 includes the cylindrical fixing portion 12 and the coil spring 15, which is disposed so as to axially extend from one end of the fixing portion 12. The urging member 11 is formed with a seat surface 19 to the upper side end reverse to the upper side end of the fixing portion 12 on the side of the coil spring 15. That is, to the upper side end of the fixing portion 12, an inclining surface formed by circumferentially chamfering the boundary portion to the inner peripheral surface of the flow passage 5*a* formed to the upper end surface and inside thereof, and this inclining surface constitutes the seat surface 19.

On the other hand, the inclining surface 25 chamfered along the outer peripheral edge is formed to the lower surface of the valve body 24 constituting the spool 20. The inclining surface 25 abuts against the seat surface 19, and then, the spool 20 shuts off the flow passage 5 formed inside the fixing portion 12.

With the check valve 10 of this embodiment, the fixing portion 12 of the urging member 11 and the valve body 24 of the spool 20 are directed toward the mouth portion (6) side. On the other hand, the coil spring 15 of the urging member 11 and the shank portion 21 of the spool 20 are directed toward the bag body (30) side, so that the check valve 10 is fixed inside the spout assembly 1 without a gap. When the check valve 10 is housed in the spout assembly 1, the upper surface of the valve body 24 constituting the spool 20 is fixed so as to be flush with the upper end of the mount portion 6 of the spout assembly 1.

As to the spout assembly 1 of this embodiment, the check valve 10 also functions as follows. In the case where any external force is not applied to the bag body, not shown, and an inner pressure is low, the spool 20 is depressed by the urging force of the coil spring 15 toward the bag body side. In this state, the valve body 24 abuts against the seat surface 19 to thereby shut off the flow passage 5 of the spout assembly 1 and the invasion of the air into the bag body is surely blocked. On the contrary, when the inner pressure increases by, for example, grasping the bag body, the spool 20 is pushed upward against the urging force of the coil spring 15. Thus, the valve body 24 of the spool 20 is separated from the seat surface 19 of the fixing portion 12, and the flow-passage in the spout assembly 1 is ensured. Further, the displacement (moving distance) of the spool 20 varies in accordance with the inner pressure of the bag body. By using this matter, the discharging amount of the inner content is freely adjusted.

Furthermore, with the spout assembly of this embodiment, the inner content may be taken out by sucking out through the mouth portion as well as in the case of increasing the inner pressure of the bag body.

FIGS. 7 to 11 represent an applied example in which the urging member of the check valve is not provided with the drip preventing portion. In the illustrated spout assembly, the basic structure is substantially the same as that mentioned above, so that like reference numerals are added to portions or members corresponding to those of the former embodiment and duplicated explanation is omitted herein. Further, although there is explained a case in which the inner content is discharged outward by increasing the inner pressure of the bag body, the inner content may be sucked out through the mouth portion.

Figure 7:
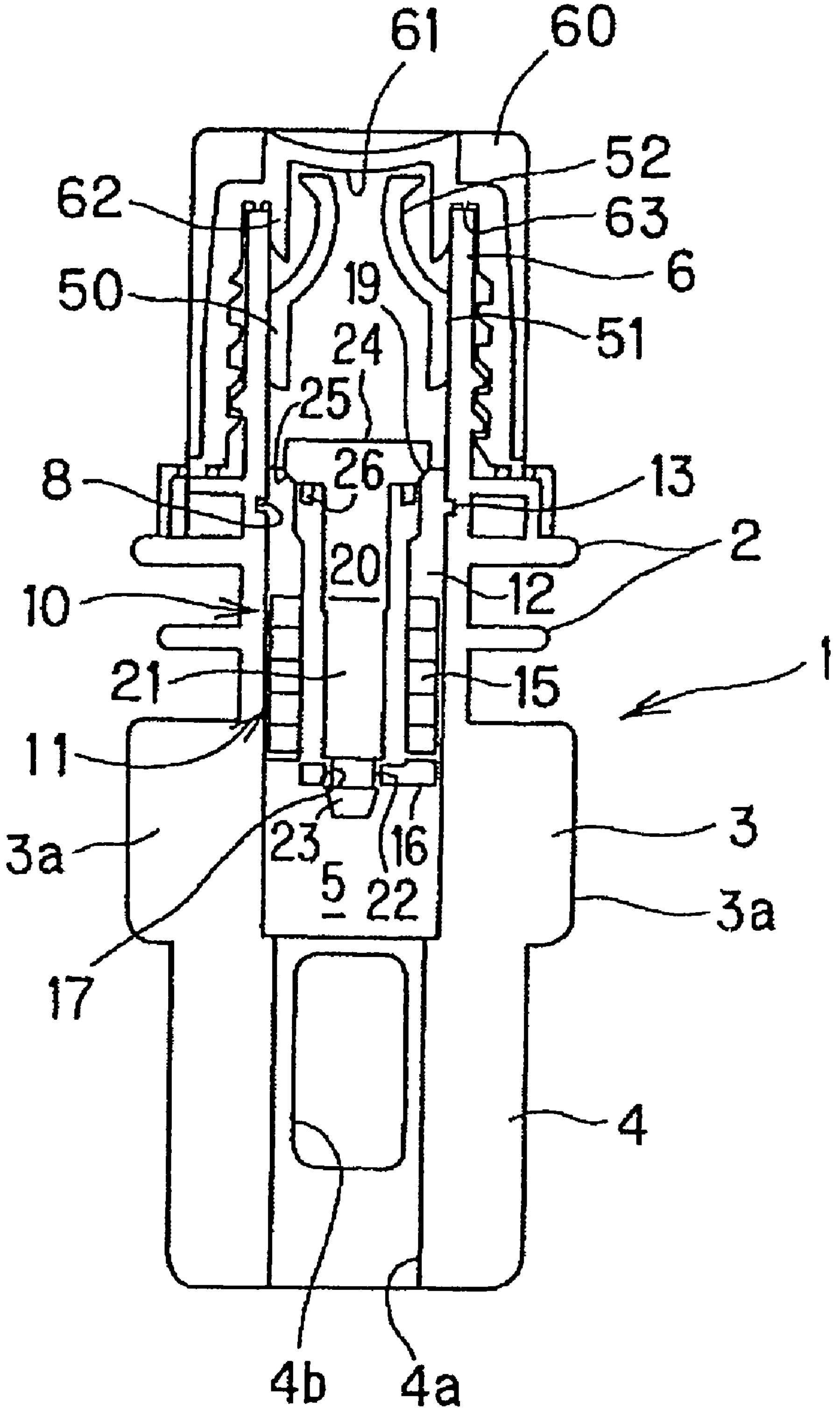
FIG. 7 is an elevational section showing an example of a spout assembly provided with a discharge guide.

In the spout assembly a shown in FIG. 7, the check valve 10 is composed of the urging member 11 and the spool 20. The check valve 10 is accommodated in the spout assembly 1 such that the fixing portion 12 and the valve body 24 are directed to the mouth portion (6) side, and the coil spring 15 of the urging member 11 and the shank portion 21 of the spool 20 are directed toward the bag body side. In this meaning, this arrangement accords with that of the above-mentioned embodiment.

In the spout assembly 1 of this embodiment, however, the check valve 10 is fixed to substantially the intermediate position in the axial direction of the spout assembly 1, and a certain space exists between the upper surface of the valve body 24 and the mouth portion 6. To this space, a discharge guide 50 is fitted.

The discharge guide 50 is composed of a cylindrical base portion 51 and a conical guide portion 52 tapered axially forward. The base portion 51 has an outer peripheral surface which tightly contacts the inner peripheral surface of the spout assembly 1 at a position slightly recessed from the mouth portion 6 of the spout assembly 1. The guide portion 52 is disposed so that its front end projects over the mouth portion 6 of the spout assembly 1. This discharge guide 50 serves as a throttle for discharging the inner content at a high pressure.

The spout assembly 1 provided with such discharge guide 50 is preferred to be utilized, for example, for discharging the inner content to a position slightly apart from the front end of the mouth portion 6.

Further, a cap 60 for opening or closing the mouth portion 6 of the spout assembly 1 has an upper surface suitable for sealing the discharge guide 50 together. The inner surface of the upper surface portion of the cap 60 has a circular recess 61 at its central portion. This recess 61 is a portion accommodating the front end of the guide portion of the discharge guide 50, having an inner diameter slightly larger than the outer diameter of the front portion of the guide portion 52. The inner surface of the upper surface portion in the recess 61 has a spherical shape protruding downward at its central portion.

Furthermore, to the inner surface of the upper surface portion, is formed a ring-shaped member 62 so as to protrude downward to be flush with the outer peripheral edge of the recess 61. A constant gap is formed between this ring-shaped member 62 and the inner peripheral surface of the cap 60. In this gap, a projecting thread 63 having semi-circular shape in section is formed so as to extend along the circumferential direction on the inner surface of the upper portion.

When such a cap 60 is fitted to the mouth portion 6 of the spout assembly 1, as shown in FIG. 7, the mouth portion 6 of the spout assembly 1 takes a state inserted into the gap between the ring-shaped member 62 and the inner peripheral surface of the cap 60. Then, the upper end surface of the mouth portion 6 abuts against the projecting thread 63 formed to the gap portion to thereby prevent formation of a gap between the spout assembly 1 and the inner surface of the cap 60. In addition, the spherical portion formed inside the recess 61 seals the front end of the discharge guide 50 so as to prevent the inner content remaining at the front end portion of the mouth portion 6 from leaking outward.

For this spout assembly 1 of this embodiment, the displacement of the spool 20 may be suitably changed by controlling the force for grasping the bag body to thereby adjust the discharging amount of the inner content.

Figure 8:
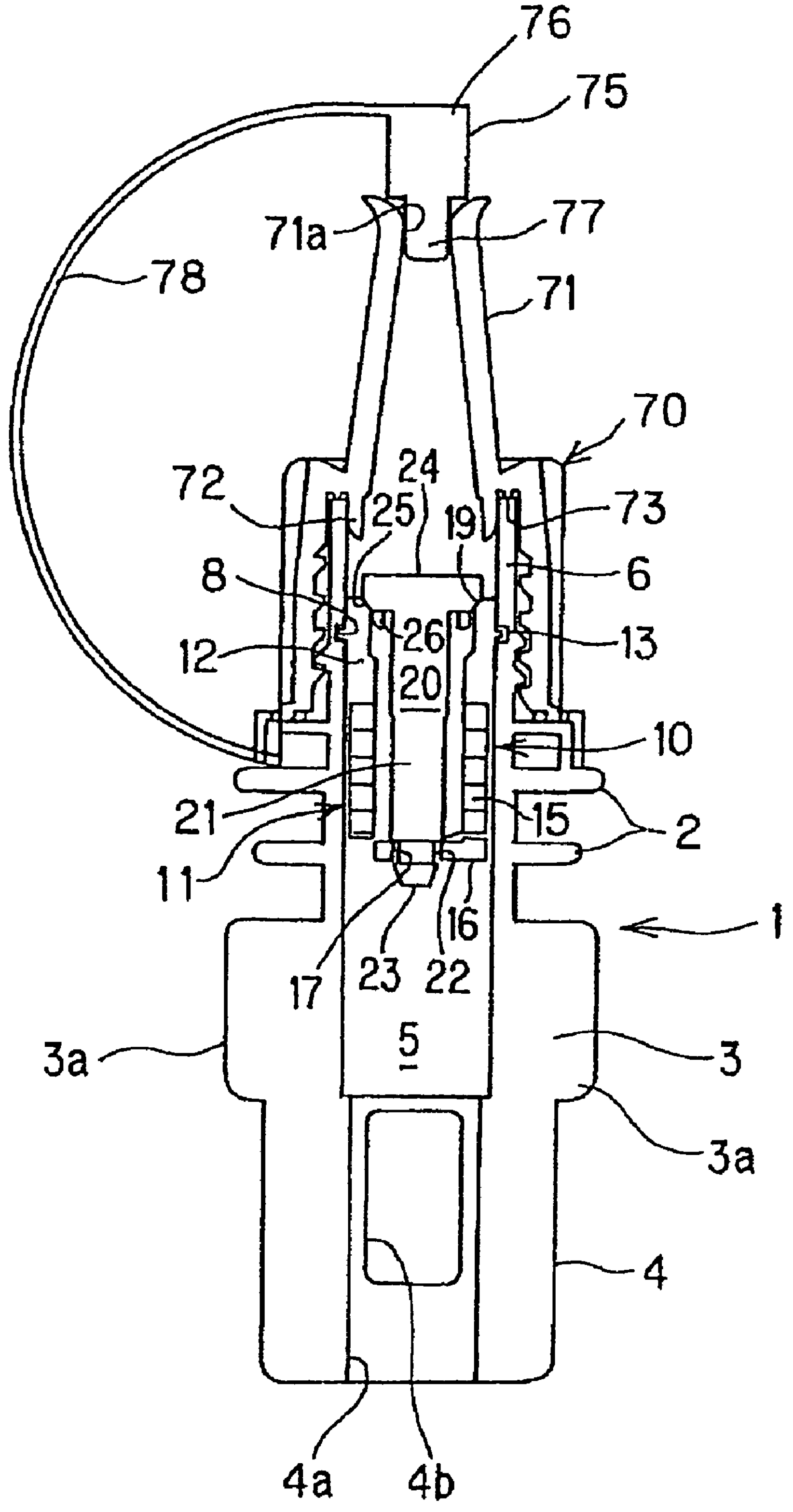
FIG. 8 is an elevational section of an example of a spout assembly having a cap having a discharge guide provided thereto.

FIG. 8 shows a further embodiment, in which a cap 70 itself is provided with a function of a discharge guide 71.

The check valve 10 is accommodated in the spout assembly 1 such that the fixing portion 12 of the urging member 11 and the valve body 24 of the spool 20 are directed to the mouth portion (6) side, and the coil spring of the urging member 15 and the shank portion 21 of the spool 20 are directed toward the bag body side. Further, a gap formed between the seat surface formed to the fixing portion 12 and the valve body 24 is widened in accordance with the displacement of the spool 20. The displacement of the spool 20 is determined in response to the inner pressure of the bag body. In addition, the check valve 10 is fixed to the axially intermediate position of the spout assembly 1, and a certain space exists between the upper surface of the valve body 24 and the upper end of the mouth portion.

On the other hand, the cap 70 is provided, at its upper surface portion, with a discharge guide 71 for discharging the inner content. The discharge guide 71 has a conical shape so as to further project over the upper surface of the cap 70. This discharge guide 71 has its tip end as a discharging port 71*a* which is clogged by a plug member 75.

The plug member 75 has a cylindrical body portion 76 and an insertion portion 77 extending axially from the end surface of the body portion and having a diameter smaller than that of the body portion 76. The insertion portion 77 is inserted into the discharge port 71*a* of the discharge guide 71 to thereby close and seal the discharge port 71*a*. A connection string 78 is provided integrally to the body portion 76 of the plug member 75, and the front end of the connection string 78 is connected to the spout assembly 1. The plug member 75 is connected to the spout assembly 1 through this connection string 78, and the plug member 75 does not come off from the spout assembly 1 even if the plug member 75 is removed therefrom.

On the other hand, he ring-shaped member 72 is formed to the inner surface of the upper surface portion of the cap 70 so as to project downward, and a constant gap exits between the ring-shaped member 72 and the inner peripheral surface of the cap 70. In this gap, a projecting thread 73 extending in the circumferential direction is formed on the inner surface of the upper surface portion of the cap 70. This projecting thread 73 abuts against the upper end surface of the mouth portion of the spout assembly 1 and prevents the inner content remaining outside the check valve 10 from leaking outward of the cap 70.

According to such a spout assembly 1, the inner content filling the bag body is taken out only by removing the plug member 75 from the discharge port 71*a* of the discharge guide 71, thus being convenient. In this case, the check valve 10 shuts off the flowing of the inner content inside the spout assembly 1, and accordingly, the inner content is not taken out only by removing the plug member 75, and it becomes necessary to grasp the bag body to increase the inner pressure. That is, according to this spout assembly 1, even if the packaging bag is fallen down with the plug member 75 being removed, the inner content does not flow out from the packaging bag, thus being effective.

On the contrary, even if the packaging bag is left with the plug member 75 being removed from the discharge port 71*a*, the check valve 10 shuts off the flow passage of the spout assembly 1, thus preventing air from coming into the bag body.

The spout assembly 1 of this embodiment may suitably change the displacement of the spool 20 by controlling the force for grasping the bag body and adjust the inner content to be discharged.

Figure 9:
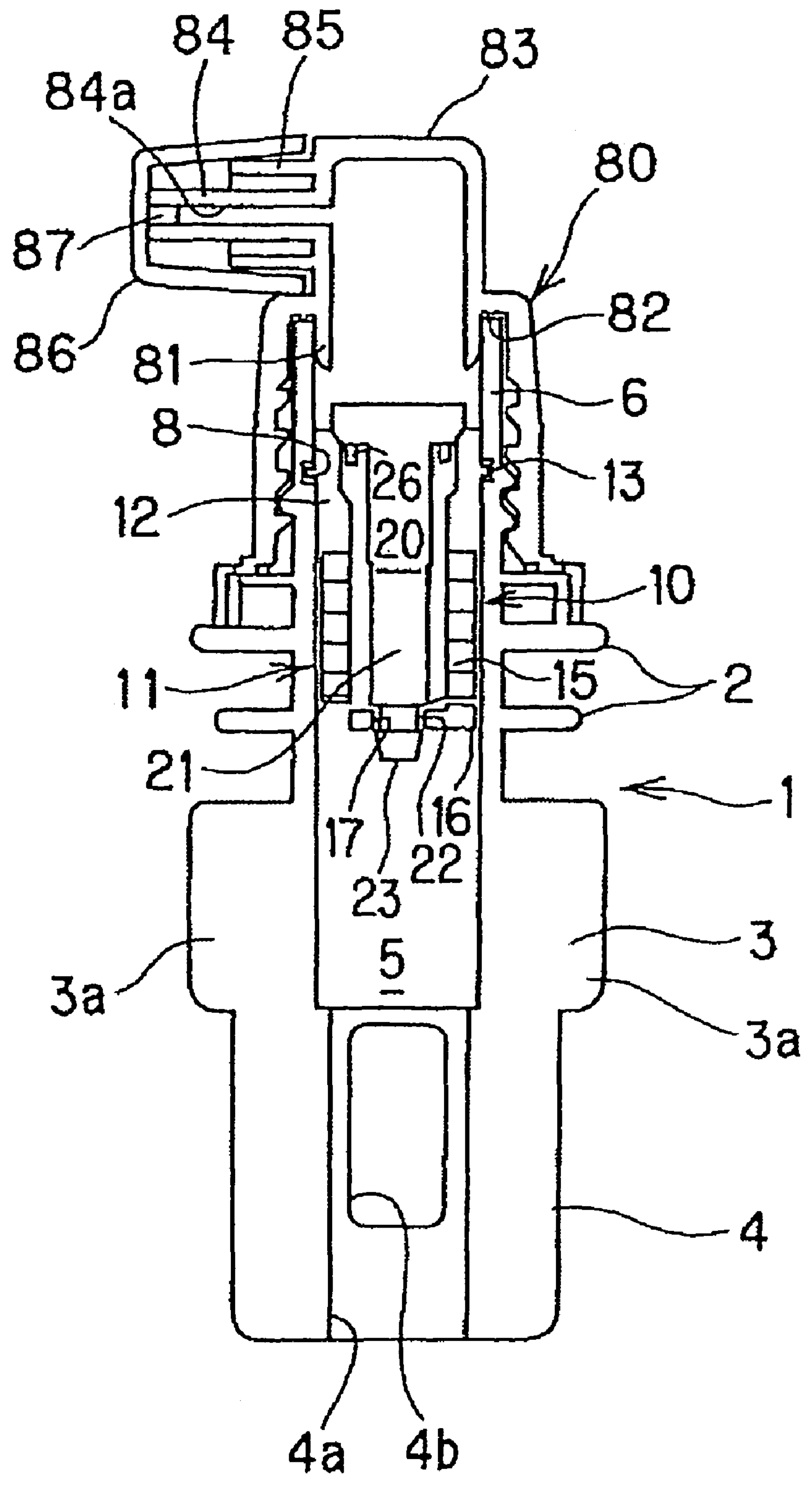
FIG. 9 is an elevational section of a spout assembly having a cap having a discharge guide provided thereto, which is different from the spout assembly of FIG. 8.

FIG. 9 represents another embodiment of a spout assembly provided with a discharge guide 84 to a cap 80. Further, structures other than the cap 80 are identical to those of the spout assembly 1 shown in FIG. 8, so that in this embodiment, description is made only to the cap 80.

This cap 80 has a cylindrical portion 83 projecting upward from the upper surface portion of the cap 80. The cap 80 has a discharge guide 84 formed so as to extend radially outward form the side surface of the cylindrical portion 83. The cylindrical portion 83 is disposed coaxially with the spout assembly 1 and has an inner hollow structure. The discharge guide 84 has a fine tubular structure and is formed with an inner flow passage 84*a* communicating with the inside of the cylindrical portion 83. A ring-shaped holding portion 85 is formed to the side surface of the cylindrical portion 83 so as to surround the discharge guide 84.

In addition, this cap 80 is provided with a second cap 86 for opening or closing the front end of the discharge guide 84. The second cap 86 has a conical outer shape tapered forward, and has a forward end closed and rearward end opened. The second cap 86 is also provided with an inserting portion 87 projecting from the central portion of the inner surface of the closed front end toward the opened rear end.

When the discharge guide 84 is closed by the second cap 86, the opened end side of the second cap 86 is applied to the outer peripheral surface of the holding portion 85 formed to the side surface of the cylindrical portion 83, and simultaneously, the inserting portion 87 is inserted into the front end of the discharge guide 84 to thereby close the discharge guide 84.

In a case where this spout assembly 1 shown in FIG. 9 is applied to a packaging bag, the inner content is taken out only by horizontally laying the packaging bag without turning upside down the same. Further, with the check valve 10 housed in this spout assembly 1, the displacement of the spool 20 varies in response to the inner pressure of the bag body. Thus, the bag body is strongly grasped when it is required to take out a large amount of inner content, and on the contrary, when it is required to take out a small amount of inner content, the bag body will be weakly grasped.

Furthermore, in a case where the packaging bag is left with the second cap being not closed, the check valve blocks the flow passage inside the spout assembly 1, preventing air from entering inside the bag body, thus effectively preventing the inner content from oxidizing.

Figure 10:
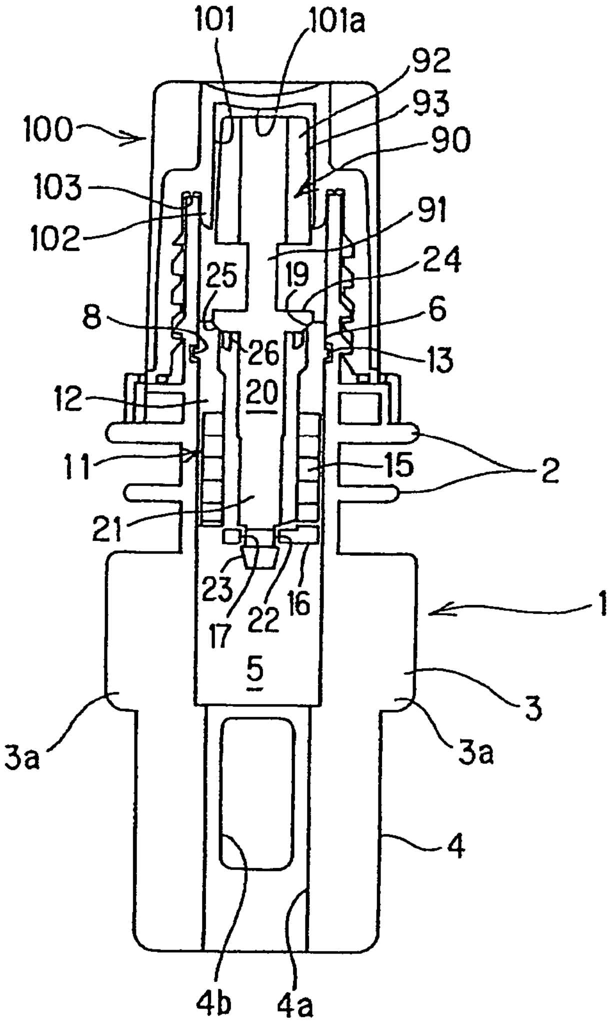
FIG. 10 is an elevational section showing an example of a spout assembly having a check valve with an inserted portion housed therein.

FIG. 10 represents a spout assembly according to a further embodiment of the invention.

Further, it is to be noted that in the check valves housed in the spout assemblies shown in FIGS. 6 to 10, the urging members and the spools are formed of resin material through molding process. Further, although as means for fixing the check valve inside the spout assembly, there is shown an engagement pawl formed to the outer peripheral surface of the fixing portion so as to be engaged with an engagement groove formed to the inner peripheral surface of the spout assembly, the invention is not limited to such structure, and the engagement pawl may be formed to the inner peripheral surface of the spout assembly, and on the other hand, the engagement groove may be formed to the outer peripheral surface of the fixing portion.

The check valve 10 housed in the spout assembly 1 of FIG. 10 is composed of the urging member 11 and the spool 20, in which the urging member 11 is fixed inside the spout assembly 1 at the axially central portion of the spout assembly 1.

The urging member 11 is composed of the cylindrical fixing portion 12 and the coil spring 15 axially extending from an axial one end of the fixing portion 12. The engagement pawl 13 is formed to the outer peripheral surface of the fixing portion, and this engagement pawl 13 is engaged with the engagement groove 8 formed to the inner peripheral surface of the spout assembly 1 to thereby fix the urging member 11 to the spout assembly 1. The reverse side of the coil spring 15 in its axial direction is formed with a seat surface 19 against which the spool 20 abuts. This seat surface 19 is formed by chamfering, obliquely entirely circumferentially, a boundary portion between the end surface of the fixing portion 12 and the flow passage in the fixing portion 12.

In the meantime, the coil spring 15 is provided so as to extend toward the bag body side from the axially bag body side end of the fixing portion 12. An end plate 16 is formed integrally to the front end of the coil spring. A hole 17 is formed to the central portion of the end plate 16 so as to be engaged with the spool 20.

On the contrary, the spool 20 includes a rod-shaped shank portion 21 to be inserted into the urging member 11 and a disc-shaped valve body 24 formed to one end of this shank portion 21. An engagement groove 22 is formed to the front end of the shank portion 21 and this engagement groove 22 is fitted into the hole 17 formed to the end plate 16. Further, the inclining surface 25 is formed to the peripheral edge of the valve body 24 by chamfering the rear surface thereof so as to closely contact the seal surface 19.

Figure 11:
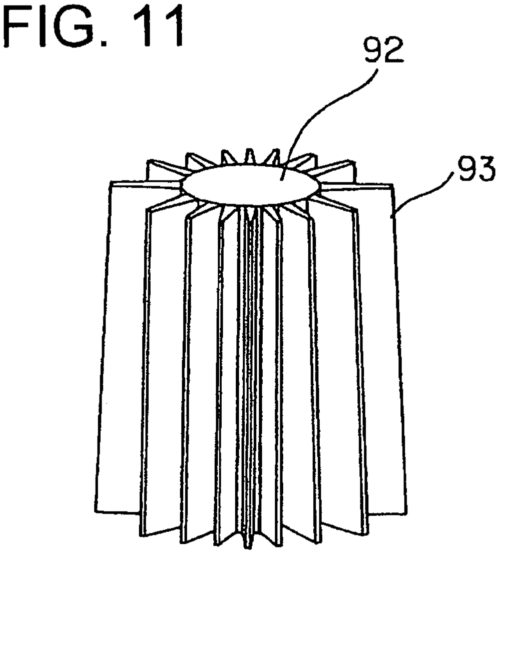
FIG. 11 is a perspective view of a head portion constituting the inserted portion shown in FIG. 10.

Furthermore, this spool 20 is formed with an inserted portion 90 on the upper surface side of the valve body 24. This inserted portion 90 includes a stud 91 extending upward from the upper surface of the valve body 24 and a head 92 formed to the upper portion of the stud 91 so as to slightly protrude from the mouth portion 6 of the spout assembly 1. This head 92 has, as shown in FIG. 11, a conical outer appearance and is provided with a plurality of projections 93 so as to extend vertically on the entire outer peripheral surface thereof. The head 92 serves to return the inner content remaining on the mouth portion 6 in the spout assembly 1 by the virtue of surface tension of liquid. That is, a trough formed between the projections on the outer peripheral surface of the head 92 functions as introducing passage of the liquid so as to return the remaining inner content inside the spout assembly 1.

Further, this spout assembly 1 is also equipped with a cap 100 for opening or closing the mouth portion 6 of the spout assembly 1 by fastening the cap to the spout assembly 1. The cap 100 is provided, at its inner surface of the upper portion thereof, with an accommodation portion 101 for accommodating the head 92 inside thereof. This accommodation portion 101 is a portion formed by circularly recessing the central portion of the inner surface of the upper portion of the cap 100. The cap 100 is formed with the accommodation portion 100, so that it has a height higher than a usual one. Further, inside the accommodation portion 101, there is provided a spool holder 101*a* by forming the inner surface of the upper portion thereof so as to provide a spherical shape, so that when the cap 100 is fastened, the head 92 of the inserted portion 90 is pressed downward to push the valve body 24 against the seat surface 19.

By applying the spout assembly provided with the above mentioned structures to a packaging bag, it is possible to taken out the inner content filling the bog body at a suitably adjusted amount, and in addition, the inner content is effectively prevented from being oxidized. That is, with the check valve 10 housed in this spout assembly 1, the displacement of the spool 20 varies in response to the inner pressure of the bag body. Thus, when it is required to take out a large amount of the inner content, the bag body may be grasped with a strong force, and on the contrary, when it is required to take out a small amount of the inner content, the bag body may be grasped with a weak force. The remaining content near the mouth portion 6 of the spout assembly 1 is returned into the spout assembly 1 by the action of the surface tension of the inner content by the virtue of the irregularity formed to the head 92 of the inserted portion 90.

Furthermore, when the packaging bag is left with the cap being not closed, the check valve 10 shuts off the flow passage 5 in the spout assembly 1. Thus, the invasion of the air into the bag body is effectively prevented, thus effectively preventing the inner content from being oxidized.

The invention claimed is:

1. A spout assembly mounted to a bag body having an inner content accommodated therein and configured to discharge the inner content filling the bag body, the spout assembly comprising:

a check valve housed within the spout assembly configured for permitting the inner content to flow only from a bag body side to a mouth portion side of the bag body, the check valve including a spool to move along an axial direction of the spout assembly; and an urging member having an outer peripheral surface fixed to an inner peripheral surface of the spout assembly and configured to urge the spool toward the bag body side, the urging member being formed with a seat surface for the spool urged by the urging member to abut against the seat surface, and the urging member configured to press the spool against the seat surface to thereby shut off flowing of the inner content inside the spout assembly, and when an inner pressure inside the bag body or a suction force from the mouth portion reaches a predetermined value, the spool is separated from the seat surface against an urging force of the urging member, thereby permitting the inner content to flow from the bag body side to the mouth portion side, wherein the urging member includes a fixing portion for fixing the urging member in the spout assembly, the fixing portion including a drip preventing portion to prevent, from dripping down, an inner content taken out of the bag body and remaining to the end portion of the spout assembly, wherein the drip preventing portion projects from the end of the spout assembly, having an inner surface widened toward an outside in the axial direction of the spout assembly, and wherein the seat surface is formed to the inner peripheral surface of the drip preventing portion, and the valve body abuts against the seat surface for shutting off the flowing of the inner content inside the spout assembly.

2. The spout assembly according to claim 1, wherein the urging member also includes a coil spring extending from the fixing portion along an axial direction of the urging member, the fixing portion is being formed, inside thereof, with a flow passage extending in the axial direction of the urging member, and the seat surface is being formed to an end portion side opposite to a side having the coil spring provided thereon with respect to the axial direction of the fixing portion, wherein the spool includes a shank portion inserted from the seat surface side into the flow passage of the fixing portion and the coil spring; and a valve body formed to a fixing portion side end portion of the shank portion for abutting against the seat surface, wherein the shank portion and the coil spring are provided with lock portions to be locked with each other, and the spool has a distance between the lock portion of the shank portion and the valve body formed smaller than a distance between the lock portion of the coil spring and the seat surface in a natural length of the coils spring, and wherein the spool is always urged to the bag body side by the coil spring when the shank portion and the coil spring are locked with each other.

3. The spout assembly according to claim 1, wherein the fixing portion of the urging member is directed to the mouth portion side, and the urging member is fixed to a portion in the vicinity of the mouth portion of the spout assembly.

4. The spout assembly according to claim 1, wherein the spout assembly further includes a cap fastened to the outer periphery of the spout assembly for tightly sealing the mouth portion of the spout assembly, and a pressing portion for pressing the valve body toward the urging member, and wherein the inner surface of the cap includes a seal portion to abut against the inner surface of the drip preventing portion for sealing the cap as the cap is fastened to the spout assembly.

5. The spout assembly according to claim 2, wherein the fixing portion of the urging member is directed to the mouth portion side, and the urging member is fixed to a portion in the vicinity of the mouth portion of the spout assembly.

* * * * *